(12) United States Patent
Hermey et al.

(10) Patent No.: US 9,476,480 B2
(45) Date of Patent: Oct. 25, 2016

(54) ENERGY GUIDING CHAIN

(71) Applicant: igus GmbH, Cologne (DE)

(72) Inventors: Andreas Hermey, Hennef (DE);
Thilo-Alexander Jaeker, Sankt Augustin (DE); Stefan Strack, Koenigswinter (DE)

(73) Assignee: igus GmbH, Cologne (DE)

( * ) Notice: Subject to any disclaimer, the term of this patent is extended or adjusted under 35 U.S.C. 154(b) by 0 days.

(21) Appl. No.: 14/782,166

(22) PCT Filed: Mar. 27, 2014

(86) PCT No.: PCT/EP2014/056134
§ 371 (c)(1),
(2) Date: Oct. 2, 2015

(87) PCT Pub. No.: WO2014/161763
PCT Pub. Date: Oct. 9, 2014

(65) Prior Publication Data
US 2016/0069421 A1    Mar. 10, 2016

(30) Foreign Application Priority Data

Apr. 5, 2013 (DE) ........................ 20 2013 101 457

(51) Int. Cl.
| F16G 13/16 | (2006.01) |
|---|---|
| H02G 3/04 | (2006.01) |
| H02G 11/00 | (2006.01) |

(52) U.S. Cl.
CPC ................ F16G 13/16 (2013.01); H02G 3/04 (2013.01); H02G 3/0475 (2013.01); H02G 11/006 (2013.01)

(58) Field of Classification Search
CPC .................................. F16G 13/16; H02G 3/04
USPC ........................................................ 59/78.1
See application file for complete search history.

(56) References Cited

U.S. PATENT DOCUMENTS

| 5,996,330 A | 12/1999 | Ehmann et al. |
|---|---|---|
| 8,397,480 B2 | 3/2013 | Jaeker et al. |

(Continued)

FOREIGN PATENT DOCUMENTS

| DE | 102008016954 A1 | 10/2009 |
|---|---|---|
| JP | 2000055140 A | 2/2000 |

OTHER PUBLICATIONS

English PCT International Search Report mailed Jul. 30, 2014, received in corresponding PCT Application No. PCT/EP/4156134, 3 pgs.

(Continued)

*Primary Examiner* — David B Jones
(74) *Attorney, Agent, or Firm* — Grossman Tucker Perreault & Pfleger, PLLC

(57) ABSTRACT

Energy guiding chain, whose chain links (1, 2) each consist of two side straps (3, 4) that are connected to each other by cross-members (5, 6), where the cross-members display a bearing area (7) on at least one of their ends and, seen in the longitudinal direction of the side straps (3, 4), a contact area (9) outside the bearing area. To avoid the accumulation of foreign bodies, the side (11) of the contact area of the cross-members facing from the inside of the chain outwards displays a convex curvature or a linear slope towards its contact surface (10) and encloses an angle of <90° with the inner side (3a, 4a) of the respective side strap, such that the contact surface (10) moves along the inner side of the side strap towards the inside of the chain when the cross-member is pivoted open until a completely opened position is reached.

15 Claims, 5 Drawing Sheets

(56) References Cited

U.S. PATENT DOCUMENTS

Figure 1:
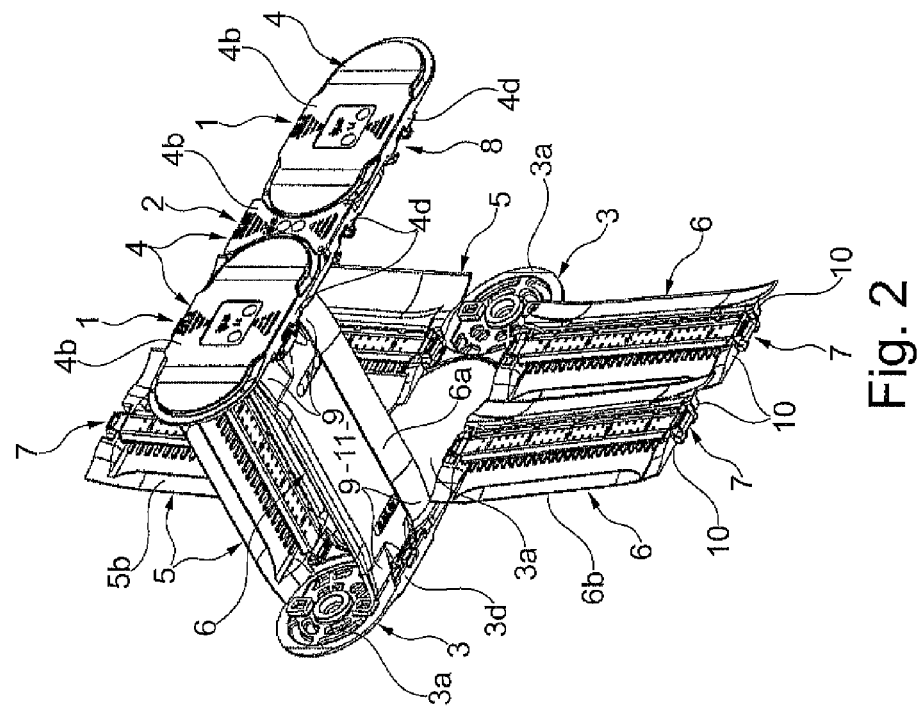

| | | | |
|---|---|---|---|
| 8,806,847 B2* | 8/2014 | Blase | F16G 13/16 59/78.1 |
| 2010/0043384 A1 | 2/2010 | Kemper | |
| 2011/0308043 A1 | 12/2011 | Nakasone | |
| 2014/0020358 A1 | 1/2014 | Blase et al. | |
| 2015/0060609 A1 | 3/2015 | Scholer et al. | |
| 2015/0159733 A1 | 6/2015 | Blase | |

OTHER PUBLICATIONS

English translation of PCT International Preliminary Report on Patentability mailed Oct. 15, 2015, received in mrresponding PCT Application No. PCT/EP14/56134, 6 pgs.

* cited by examiner

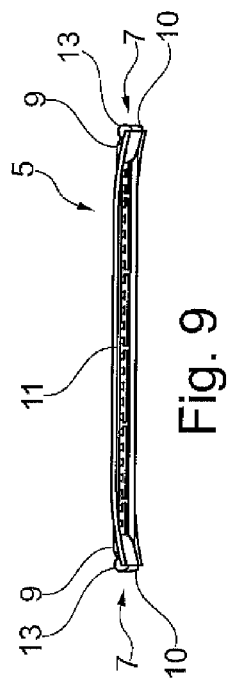
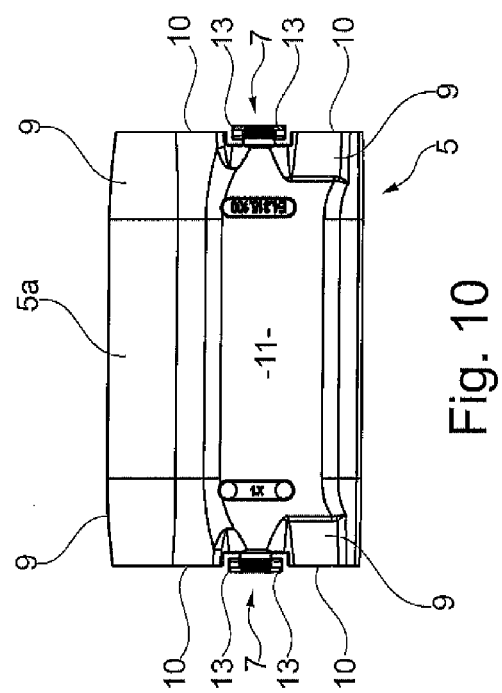
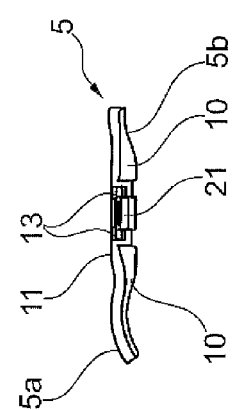
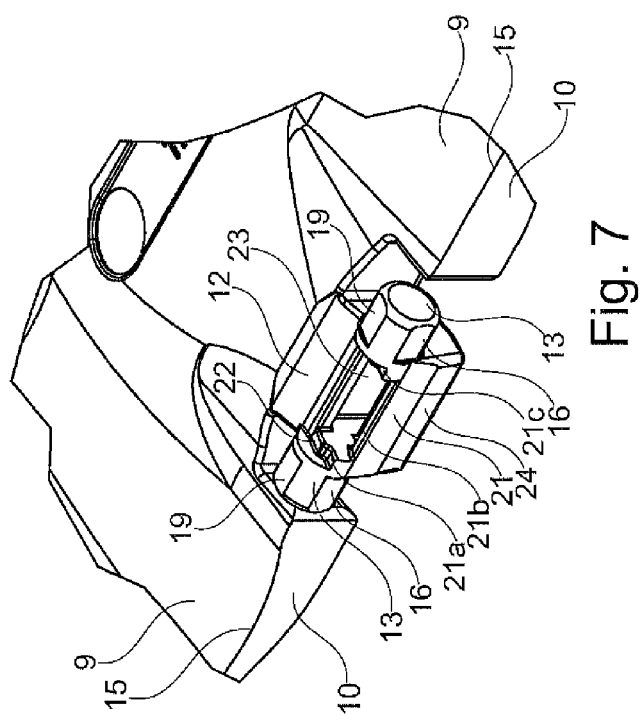

ENERGY GUIDING CHAIN

The invention relates to an energy guiding chain for guiding cables, hoses and the like from a first connecting point to a second connecting point that moves relative to the first connecting point, comprising a plurality of plastic chain links that can be pivoted relative to each other over a certain pivoting angle, each of which comprises two side straps displaying inner sides facing towards the inside of the chain, outer sides facing outwards and narrow faces running perpendicularly to them and in the longitudinal direction of the side straps, where the side straps form opposite strap strands transversely to their longitudinal direction and at least some of the opposite side straps are connected to each other by cross-members, at least some of which display a bearing area on at least one of their ends that interacts with a bearing seat, located on the side strap facing towards the aforementioned end of the cross-member, in articulated fashion for pivoting the cross-member between a closed position and an opened position, and the cross-member displays, on the aforementioned end, seen in the longitudinal direction of the side strap and outside the bearing area, a contact area, a contact surface of which lies on the inner side of the side strap when in the closed position.

An energy guiding chain of this kind is known from DE 20 2011 004 762 U. On this chain, the cross-member is of plate-like design, having a flat outer side facing from the inside of the chain outwards. On both its ends, the cross-member displays bearing areas that are located in the middle area and designed as journals. Located on either side of the middle area with the journals is a projection, extending towards the inner side of the side strap, that has a contact surface lying on the inner side of the side strap in the closed position of the cross-member. The projections form the contact area of the cross-member.

This contact area extends along the inner side of the side strap in the form of a step facing towards the inside of the chain. The purpose of the recess in the contact area, formed by the step, is to accommodate areas on the inner side of the side strap when the cross-member is pivoted into the opened position about the bearing axis defined by the journals and the bearing seat, in order to permit complete opening of the cross-member over an angle of 90° or more.

With the step-shaped contact surface of the cross-members of the aforementioned, known energy guiding chain, it is considered to be a disadvantage that, particularly in the case of wide cross-members, designed as top and bottom walls of a closed energy guiding chain, dust particles, chips or other undesirable dirt particles can accumulate in the recess and get into the inside of the chain. Sealing between the top and bottom walls of adjacent chain links can only be achieved with difficulty or insufficiently in the area of the step-shaped contact surfaces.

The step-shaped contact surfaces visually interrupt the otherwise continuously flat design of the outer side of the cross-members and disrupt their consistently uniform appearance.

The object of the invention is therefore to largely prevent, on an energy guiding chain of the kind mentioned in the opening paragraph, particularly one of closed design with overlapping top walls and bottom walls of adjacent chain links, the accumulation of dirt particles or chips in the areas in which the cross-members lie on the inner sides of the side straps, and the penetration of the dirt particles or chips into the overlapping areas of the top and bottom walls of adjacent straps, and to give the energy guiding chain a pleasing external appearance.

According to the invention, the object is solved in that, on an energy guiding chain of the kind mentioned in the opening paragraph, the side of the contact area of the cross-member facing from the inside of the chain outwards displays a convex curvature till up to its contact surface, or transitions into a linear slope, and encloses an angle of <90° with the inner side of the side strap, such that the contact surface moves along the inner side of the side strap towards the inside of the chain when the cross-member is pivoted open until the completely opened position is reached.

Owing to the convex curvature of the cross-member, or the transition into a linear slope, in its contact area, dirt particles or chips, accumulating between the upper edge of the inner side of the side strap and the outward-facing side of the contact area, can slide off via the curved or linearly sloping surface. On a closed energy guiding chain with overlapping top and bottom walls on adjacent chain links, the curved or linearly sloping surfaces permit more precise contact, and thus better sealing, of the overlapping wall sections. This very largely prevents the ingress of dirt particles or chips in these areas. Finally, the external appearance of the cross-members or the top and bottom walls is more pleasing as a result of the curvature or the linear slope in the end areas of the otherwise flat cross-members or top and bottom walls.

The cross-member can be pivoted open, all the way to its completely opened position, without being obstructed by areas on the inner side of the side strap. In this context, the contact area preferably exerts no force on the inner side of the side strap via the contact surface of the cross-member.

An angle of ≤80° between the outer side of the contact area at the point of the contact surface and the inner side of the side strap has proven to be expedient. The angle is preferably ≤70°. On the other hand, the angle is preferably >40°.

The invention is particularly suitable for an energy guiding chain where the bearing seat projects on the inner side of the side strap. In this embodiment, the contact area of the cross-member extends to the side of the bearing seat, up to the inner side of the side strap.

The bearing seat on the inner side of the side strap can be offset towards the inside of the chain in relation to the narrow face of the side strap adjacent to it.

Furthermore, the area of the outer side of the cross-member extending towards the bearing area in the longitudinal direction of the cross-member, including the bearing area, can be offset towards the inside of the chain in relation to the adjacent narrow face of the side strap when the cross-member is in its closed position.

In a preferred embodiment, the area of the outer side of the cross-member that lies outside the contact area, and extends in the longitudinal direction of the cross-member towards its bearing area, is of essentially flat design.

In a further preferred embodiment, the area of the cross-member that lies outside the contact area, and extends in the longitudinal direction of the cross-member towards its bearing area, is designed in the form of an essentially flat plate.

In a particularly expedient embodiment of the invention, the contact area comprises two contact areas located on either side of the bearing area, each having one contact surface.

At the aforementioned fastening end, the cross-member can display a shoulder, on which two journals lying on one axis are located, each of which can be inserted into a pocket-shaped journal seat located on the inner side of the side strap. The contact surface of the contact area of the cross-member can be located at the level of the axis of the journals, or offset towards the inside of the chain in relation to the axis.

In a preferred embodiment of the invention, each chain link displays lower and upper cross-members, designed as bottom walls and top walls, where the bottom and top walls of adjacent chain links overlap in telescoping fashion over the entire pivoting angle. In this embodiment, the contact areas of the bottom walls and/or top walls laterally bordering on the side straps can likewise overlap in telescoping fashion, such that these areas, too, are very largely sealed off to prevent the ingress of dust, dirt particles or chips over the entire pivoting angle of adjacent chain links.

Particularly when the cross-members are designed as top and bottom walls of a closed chain, it is advantageous that the contact area with the contact surface extends over the entire width of the cross-member outside the bearing area.

In a preferred development of the invention, the telescopically overlapping surfaces of the top and bottom walls of adjacent chain links, including the contact areas, display curvatures in sections perpendicular to the pivoting axes of the adjacent chain links that are essentially concentric to the latter and extend over the entire pivoting angle.

The convex outer sides of the overlapping areas, and the concave inner sides of the contact areas of an adjacent chain link extending over them, are preferably designed in such a way that, when the bottom or top wall of the adjacent chain link is pivoted open, the contact surface moves along the outer side of the contact area of an unopened bottom or top wall located below it. The contact surface of the outer bottom or top wall of the adjacent link preferably moves over the contact area of the unopened, inner bottom or top wall without exerting any force on this bottom or top wall.

In an advantageous development, the areas of the top wall and bottom wall, including the contact areas, that telescopically overlap the top wall or bottom wall of an adjacent chain link on the outside, are designed as wipers that can lie on the top wall or bottom wall of the adjacent chain link under prestress.

In an energy guiding chain with at least one of the embodiments described above, where the bearing area of the cross-member displays journals, the journals are, in a preferred embodiment, of cylindrical design and have a first flattened section on the lateral surface of the cylinder that lies parallel to the cylinder axis.

The journal seat of the adjacent side strap assigned to the journal can likewise display a cylindrical space that corresponds to the journal and is wider in relation to an opening for inserting the journal, such that the journal can be snapped into the journal seat.

The wall of the cylindrical space can moreover display a flattened section, where it and the first flattened section of the journal are positioned in such a way relative to each other that, in the closed position of the cross-member in relation to the side strap, the flattened section of the journal seat and the first flattened section of the journal lie opposite each other, and particularly lie on each other.

In a preferred development, the journal can display a second flattened section, lying parallel to the cylinder axis of the journal, where the second flattened section is positioned on the journal in such a way that, in the completely opened position of the cross-member in relation to the side strap, it lies opposite the flattened section of the journal seat, and particularly lies on it.

In a cross-section, the flattened sections of the journal form secants of the circumference of the cylindrical journals, and the flattened section of the journal seat forms a secant of the circumference of the cylindrical space of the journal seat.

Owing to this design of the journal and the journal seat, the journal is in a locked position in the journal seat in both the closed position of the cross-member and the completely opened position of the cross-member.

This has the advantage that the cross-member can be positioned at a stable angle relative to the adjacent side strap, on which it is mounted in pivoting fashion, both in its closed position and in its completely opened position. In the closed position of the cross-member, this angular stability guarantees lateral stability of the side straps connected to the cross-member, particularly when the opposite cross-member is opened, e.g. for inserting or replacing lines. Angular stability of the side straps relative to the cross-members connecting them is particularly guaranteed if the opposite cross-members are opened over a number of chain links.

It is particularly advantageous if the first flattened section and the second flattened section are arranged at an angle >90° relative to each other, which is swept during pivoting of the cross-member between its closed position and its completely opened position. The completely opened position of the cross-member is then inclined slightly outwards, making it easier to insert or replace lines in the energy guiding chain.

Practical examples of the present invention are described in more detail below on the basis of the drawing.

The Figures show the following:

FIG. 1 A perspective view, from above, of a section of an energy guiding chain comprising three connected chain links, FIG. 2 A perspective view, from below, of the chain section shown in FIG. 1, FIG. 3 A face-end view of the section shown in FIG. 1, in the direction of arrow III, FIG. 4 A side view of the section shown in FIG. 1, in the direction of arrow IV, FIG. 5 A top view of the section shown in FIG. 1, FIG. 6 A perspective view, from above, of an upper cross-member of the section shown in FIG. 1, FIG. 7 An enlarged view of area A, circled in FIG. 6, FIG. 8 A face-end view of the cross-member shown in FIG. 6, in the direction of arrow VIII, FIG. 9 A side view of the cross-member shown in FIG. 6, in the direction of arrow IX, FIG. 10 A top view of the cross-member shown in FIG. 6, FIG. 11 A section along line XI in FIG. 4, and FIG. 12 A section along line XII in FIG. 4, but with the lower cross-member in its closed position.

The section of an energy guiding chain shown in FIG. 1 consists of three chain links, where outer chain links 1 display opposite side straps 3 that overlap side straps 4 of inner chain link 2 on the outside. Side straps 3 and 4 form opposite strap strands transversely to their longitudinal direction that continue over the entire length of the energy guiding chain.

The energy guiding chain comprises a plurality of chain links 1, 2 that can be pivoted relative to each other over a certain pivoting angle, and extends from a first connecting point (not shown in the drawing) to a second connecting point (not shown in the drawing), which is movable relative to the first connecting point.

Figure 2:
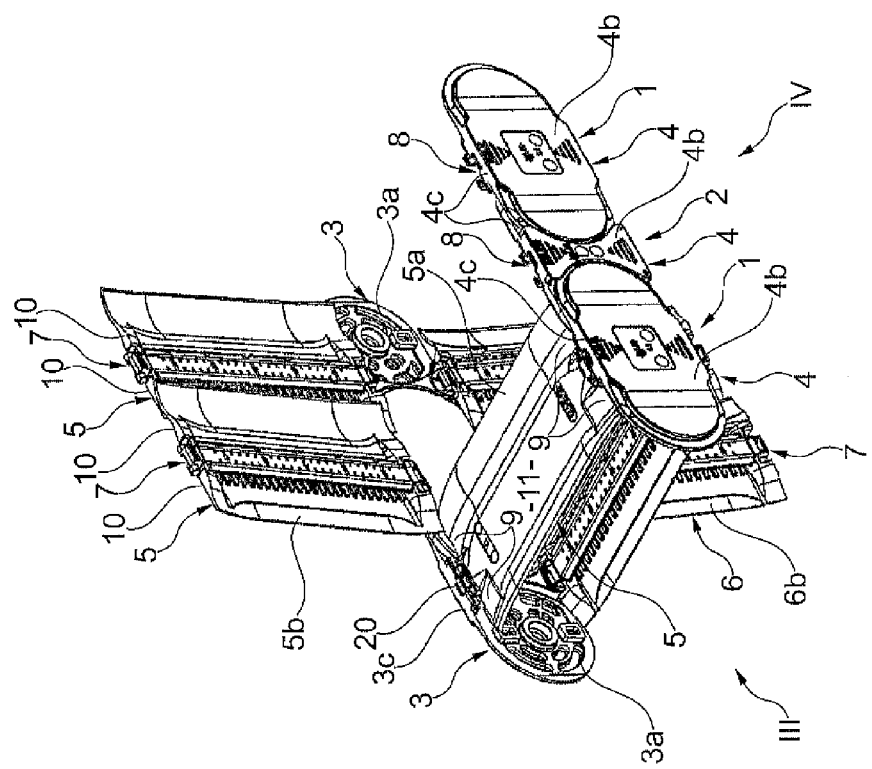

As can be seen from FIGS. 1 and 2, each side strap 3, 4 displays an inner side 3a, 4a, facing towards the inside of the chain, an outward-facing outer side 3b, 4b, and narrow faces 3c, 3d, 4c, 4d that are perpendicular thereto and run in the longitudinal direction of the side straps.

Opposite side straps 3, 4 can be connected to each other by upper cross-members 5 and lower cross-members 6. The upper cross-members are designed as top walls, and the lower cross-members are designed as bottom walls. FIGS. 1 to 5 show cross-members 5 and 6 of front chain link 1 in their closed position, while cross-members 5 and 6 of the two chain links 2 and 1, located behind, are shown in their opened position.

Cross-members 5, 6 each display a bearing area 7 on their ends that interacts with a bearing seat 8, located on side strap 3 or 4 facing towards the aforementioned end of the cross-member, in articulated fashion for pivoting the cross-member between its closed position and its opened position.

On the aforementioned end, seen in the longitudinal direction of side straps 3, 4, and outside bearing area 7, each cross-member 5, 6 displays a contact area 9, a contact surface 10 of which lies on inner side 3a, 4a of side strap 3 or 4 when cross-member 5, 6 is in its closed position.

As can particularly be seen from FIGS. 6 to 10, side 11 of contact area 9 of cross-member 5, 6, facing from the inside of the chain outwards, has a convex curvature till up to its contact surface 10. Together with inner side 3a, 4a of adjacent side strap 3 or 4, contact area 9 encloses an angle of roughly 75° at the point of contact surface 10, as can particularly be seen from FIG. 9. Owing to the convex curvature of cross-member 5, 6 in contact area 9, the cross-member can be pivoted from its closed position all the way to its completely opened position without being obstructed by areas on inner side 3a, 4a of side strap 3 or 4, as explained in greater detail below. In this context, no force is exerted on inner side 3a, 4a of side strap 3 or 4 by contact area 9 via contact surface 10.

Figure 5:
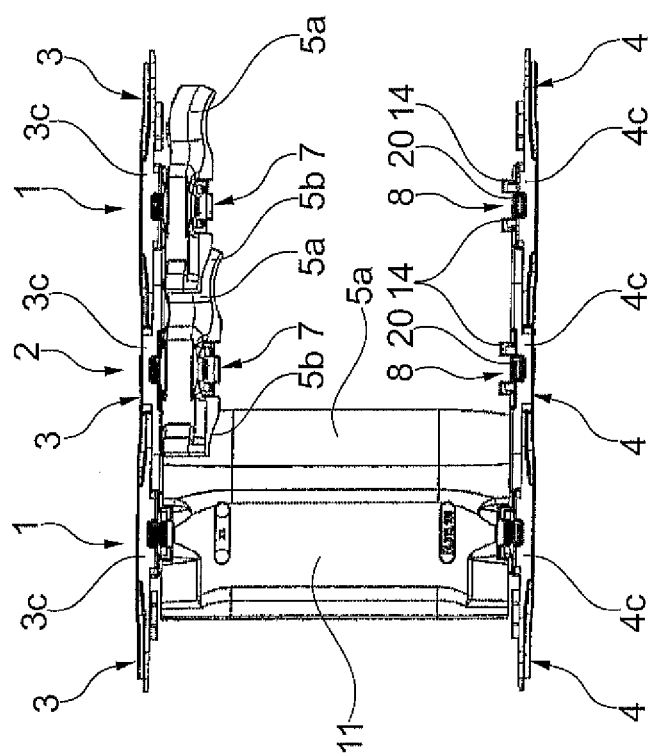

As can particularly be seen from FIG. 5, the respective bearing seat 8 for bearing area 7 on the respective end of cross-member 5, 6 projects towards the inside of the chain on inner side 3a, 4a of side strap 3 or 4. In this embodiment, contact area 9 of cross-member 5, 6 extends to the side of bearing seat 8, up to inner side 3a, 4a of side strap 3 or 4.

Figure 3:
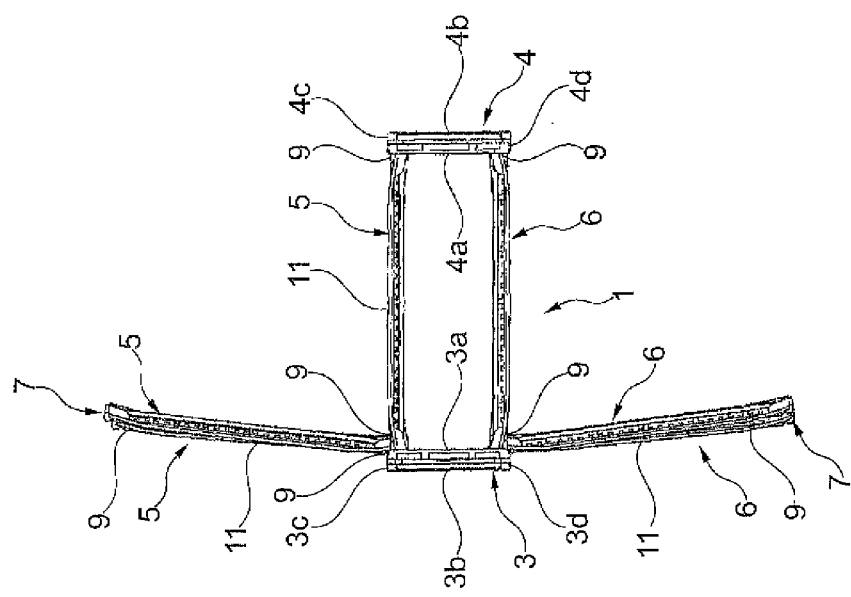

Moreover, as can particularly be seen from FIGS. 1 to 3, the bearing seat is, on inner side 3a, 4a of side strap 3 or 4, offset towards the inside of the chain in relation to narrow face 3c, 3d or 4c, 4d of side strap 3 or 4 adjacent to it.

As can likewise be seen from FIGS. 1 to 3, the area of the outer side of cross-member 5, 6 extending in the longitudinal direction of cross-member 5, 6 towards bearing area 7 is, when cross-member 5, 6 is in its closed position, slightly offset towards the inside of the chain in relation to the respectively adjacent narrow side 3c, 3d, 4c, 4d of side strap 3 or 4. As a result of the convex curvature of cross-member 5, 6 in contact area 9, the offset increases towards contact surface 10. As can furthermore be seen from the Figures, the area of outward-facing side 11 of cross-member 5, 6, lying outside contact area 9 and extending in the longitudinal direction of cross-member 5, 6 towards its bearing area 7, is of essentially flat design. Cross-member 5, 6 is designed in the form of an essentially flat plate in this area.

As can particularly be seen from FIGS. 4 and 6 to 8, contact area 9 of cross-member 5, 6 comprises two contact areas, located on either side of bearing area 7, each of which has one contact surface.

Figure 4:
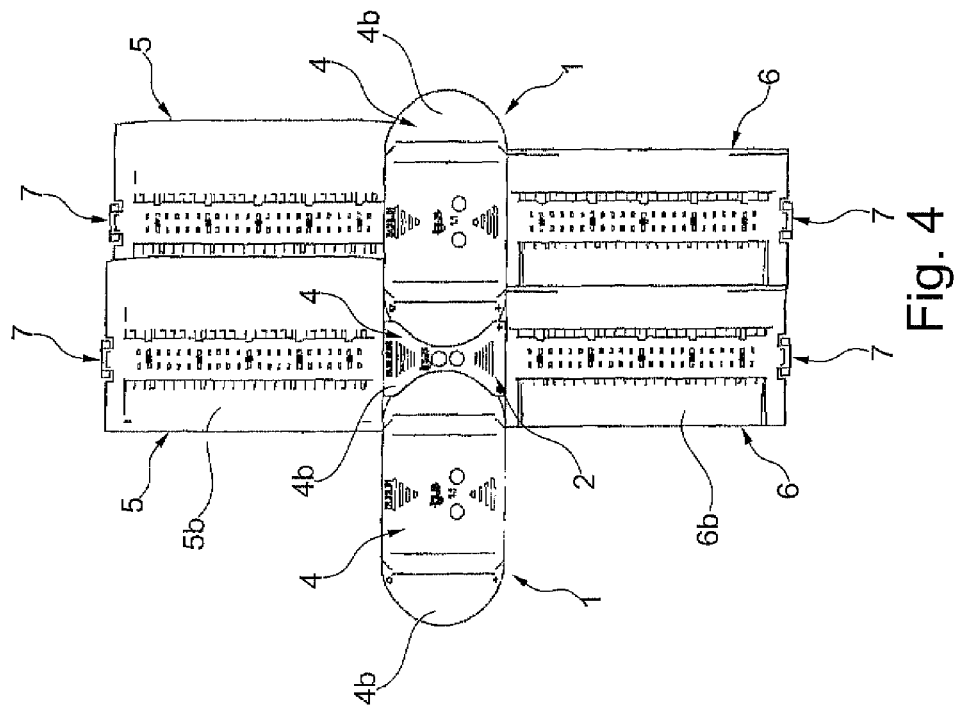

As can particularly be seen from FIG. 4, upper cross-member 5 is of wider design than lower cross-member 6. This reflects the angling direction of adjacent chain links 1, 2 in counterclockwise direction, assuming that rear chain link 1 is immobile, where the downward-facing side of the section of the energy guiding chain shown in FIGS. 1 to 5 is reduced in size and the upward-facing side of the section of the energy guiding chain is increased in the angling direction, meaning that the width of upper cross-members 5 must be greater than the width of the lower cross-members.

Contact area 9 with contact surface 10 extends over the entire width of cross-member 5, 6 outside bearing area 7.

As particularly shown in FIGS. 1, 2, 4 and 5, cross-members 5, 6 of adjacent chain links 1, 2, designed as top walls and bottom walls, overlap in telescoping fashion over the entire pivoting angle. Contact areas 9 of cross-members 5, 6, laterally bordering on side straps 3, 4, likewise overlap in telescoping fashion in this context, such that these areas, too, are sealed off against the ingress of dust, dirt particles or chips over the entire pivoting angle of adjacent chain links 1, 2.

Telescopically overlapping surfaces 5a, 5b, 6a, 6b of cross-members 5, 6 of adjacent chain links 1, 2, including contact areas 9, display curvatures in sections perpendicular to the pivoting axes of adjacent chain links 1, 2 that are essentially concentric to the pivoting axes and extend over the entire pivoting angle.

The convex outer sides (surfaces 5a, 6a) of the overlapping areas, and the concave inner sides (surfaces 5b, 6b) of contact areas 9 of an adjacent chain link 1, 2 extending over them, are designed in such a way that, when cross-members 5, 6 of adjacent chain link 1, 2 are pivoted open, contact surface 10 moves along the outer side (surface 5a or 6a) of contact area 9 of an unopened cross-member 5, 6 located below it, without exerting any force on unopened cross-member 5, 6.

The areas of cross-members 5, 6, including contact areas 9, that telescopically overlap cross-members 5, 6 of an adjacent chain link 1, 2 on the outside, are designed to function as wipers that can lie on cross-member 5, 6 of adjacent chain link 1, 2 under prestress.

Figure 6:
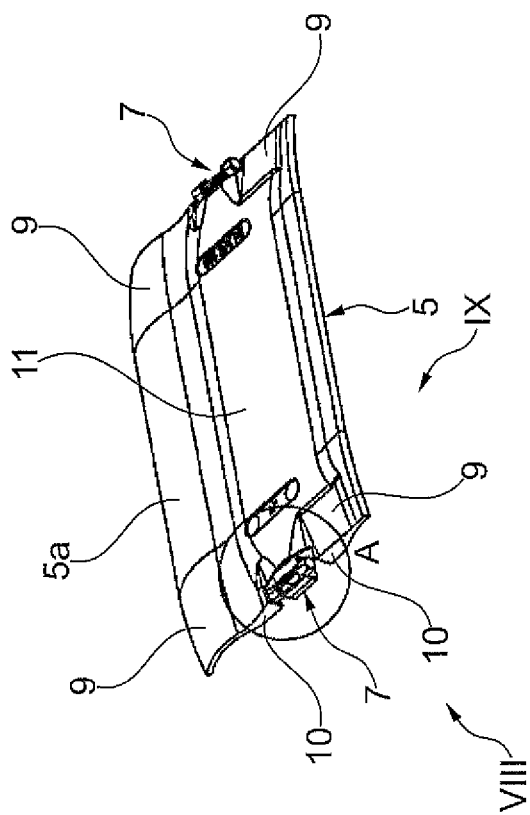

As can particularly be seen from FIGS. 6 and 7, the fastening ends of cross-members 5, 6 each display a shoulder 12, extending in the longitudinal direction of the corresponding cross-member 5, 6, on which two journals 13 lying transversely to cross-member 5, 6 and on a common axis are located.

Figure 11:
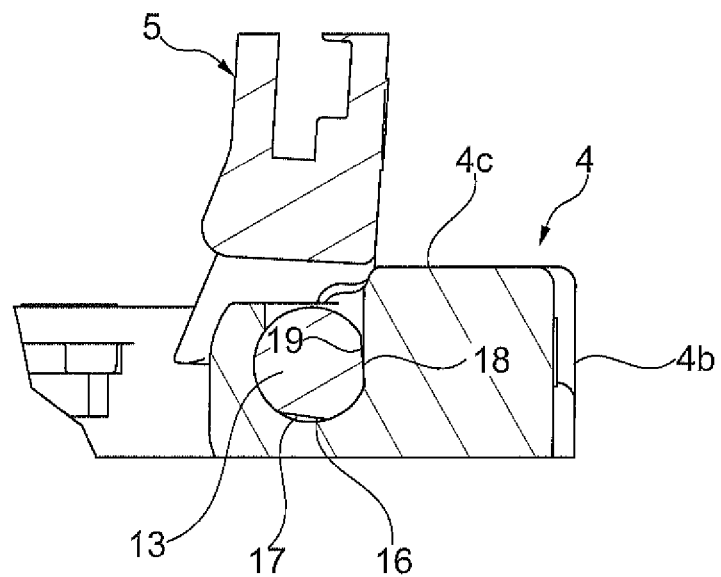
Figure 12:
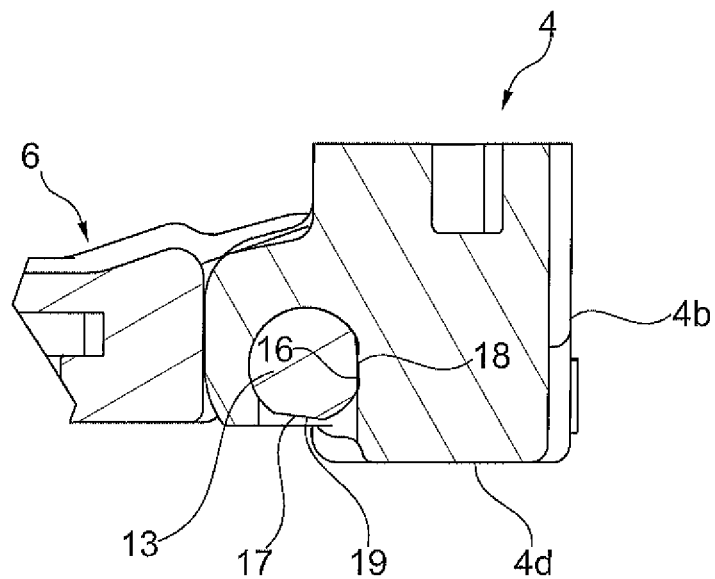

Journals 13 are designed in such a way that they can each be inserted into a pocket-shaped journal seat 14 located on inner side 3a, 4a of side strap 3 or 4, as shown in FIGS. 11 and 12.

Edge 15 of contact surface 10 of contact area 9 of cross-member 5, 6, facing outwards from the inside of the chain parallel to side straps 3, 4, extends below the axis of journals 13, up to its level at most. On one side of bearing area 7, the edge extends in linear fashion in the longitudinal direction of side straps 3, 4, while, on the other side of bearing area 7, upper edge 15 of contact surface 10 extends in a wavy shape, having an essentially concave area leading away from bearing area 7, followed by a convex area in the overlapping area.

As can particularly be seen from FIGS. 7, 11 and 12, journals 13 are of essentially cylindrical design and have a first flattened section 16 on the lateral surface of the cylinder that lies parallel to the axis of journals 13. Journal seat 14 assigned to journal 13 displays a cylindrical space 17 that corresponds to journal 13 and is wider in relation to an opening for inserting journal 13, such that journal 13 can be snapped into journal seat 14. The wall of cylindrical space 17 displays a flattened section 18, corresponding to the first flattened section of journal 13, where it and first flattened section 16 of journal 13 are positioned in such a way relative to each other that, in the closed position of cross-member 5, 6, flattened section 18 of journal seat 14 and first flattened section 16 of journal 13 lie on each other.

As shown in FIGS. 11 and 12, journal 13 displays a second flattened section 19, lying parallel to the axis of journal 13, where second flattened section 19 is positioned on journal 13 in such a way that it lies on flattened section 18 of journal seat 14 in the completely opened position of cross-member 5, 6. In a cross-section, flattened sections 16 and 19 of journal 13 form secants of the circumference of essentially cylindrical journal 13, and flattened section 18 of journal seat 14 forms a secant of the circumference of essentially cylindrical space 17 of journal seat 14.

Owing to the design of journal 13 and journal seat 14 described above, journal 13 is in a locked position in journal seat 14 in both the completely opened position of cross-member 5, 6 and the closed position of cross-member 5, 6, as shown in FIGS. 11 and 12.

As can likewise be seen from FIGS. 11 and 12, first flattened section 16 and second flattened section 19 of journal 13 are arranged at an angle >90° relative to each other, which is swept during pivoting of cross-member 5, 6 between its closed position and its completely opened position.

For further fastening of cross-member 5, 6 on adjacent side strap 3, 4, the latter displays, between journal seats 14 in the area of upper narrow face 3c, 4c and lower narrow face 3d, 4d, a snap-fitting device with a snap-in nose 20, as can be seen from FIG. 5, for example. Snap-in nose 20 interacts with a snap-in strip 21, located on the corresponding fastening end of cross-member 5, 6, such that snap-in nose 20 reaches over snap-in strip 21 in the closed position of cross-member 5, 6. In keeping with the location of snap-in nose 20 between journal seats 14, snap-in strip 21 is positioned with an offset towards the inside of the chain in the area between journals 13. As can be seen from FIG. 7, the end areas of snap-in strip 21 lying in the longitudinal direction of side straps 3, 4 are integrally moulded on the face ends of journals 13 pointing towards each other. Snap-in strip 21 displays three essentially plane surfaces 21a, 21b, 21c, on which snap-in nose 20 lies in the locked position of cross-member 5, 6. Surfaces 21a and 21c border on the opposite face ends of journals 13. The snap-in strip displays a lower-lying surface 21b in the middle area between these surfaces.

Accordingly, when cross-member 5, 6 is in the locked position, snap-in nose 20 lies on the two outer surfaces 21a and 21c. In its middle area, located above lower-lying surface 21b, snap-in nose 20 displays a projection that reaches farther down and lies on lower-lying surface 21b of snap-in strip 21 in the locked position of cross-member 5, 6. Snap-in nose 20 thus interacts with snap-in strip 21 over its entire extension in the longitudinal direction of side straps 3, 4.

The lower-lying area of snap-in strip 21 makes it possible, using a suitable tool such as a screwdriver, to press on snap-in nose 20 from the side of cross-member 5, 6, in order to release snap-in strip 21 of cross-member 5, 6 from the locked position with snap-in nose 20.

Snap-in nose 20 is provided on an elastically flexible snap-in hook, which is located on the bottom of a recess that is open towards narrow face 3c, 3d, 4c, 4d of side strap 3, 4 and towards the inside of the chain.

As can further be seen from FIG. 7, adjoining the side of outer surfaces 21a, 21c of snap-in strip 21 facing towards shoulder 12 of cross-member 5, 6 is an area 22, which projects relative to these surfaces, runs around the axis of journals 13 and is connected to shoulder 12 of cross-member 5, 6. Area 22 serves to reinforce the transition between snap-in strip 21 and shoulder 12. When pivoting cross-member 5, 6 about the axis of journals 13, the outer contour of areas 22 prevents contact with snap-in nose 20 of the snap-in hook.

As shown in FIG. 7, an opening 23 is provided between areas 22.

As can likewise be seen from FIG. 7, the side of snap-in strip 21 facing towards adjacent side strap 3, 4 displays an inclined sliding surface 24, running towards the inside of the chain, which interacts with snap-in nose 20 on the snap-in hook in such a way that the latter is pushed outwards in the recess when journals 13 of cross-member 5, 6 are inserted into journal seats 14, given an essentially perpendicular position of cross-member 5, 6 relative to side strap 3, 4. In the closed position of cross-member 5, 6, inclined sliding surface 24 lies on the side of the snap-in hook facing towards the inside of the chain, below snap-in nose 20 and the lower-reaching projection.

LIST OF REFERENCE NUMBERS

1 Chain link
2 Chain link
3 Side strap
3a Inner side
3b Outer side
3c Narrow face
3d Narrow face
4 Side strap
4a Inner side
4b Outer side
4c Narrow face
4d Narrow face
5 Upper cross-member
5a Telescopically overlapping surface
5b Telescopically overlapping surface
6 Lower cross-member
6a Telescopically overlapping surface
6b Telescopically overlapping surface
7 Bearing area
8 Bearing seat
9 Contact area
10 Contact surface
11 Outward-facing side
12 Shoulder
13 Journal
14 Journal seat
15 Edge of the contact surface
16 First flattened section
17 Cylindrical space
18 Flattened section
19 Second flattened section
20 Snap-in nose
21 Snap-in strip
21a Surface
21b Surface
21c Surface
22 Area
23 Opening
24 Inclined sliding surface

What is claimed is:

1. An energy guiding chain for guiding supply lines from a first connecting point to a second connecting point that moves relative to the first connecting point, comprising:
a plurality of plastic chain links pivotable relative to each other over a pivoting angle,
each plastic chain link of the plurality of chain links comprising two side straps, each side strap of the two side straps having an inner side facing towards an inside of the chain, an outer side facing outwards from the chain and opposing narrow faces arranged perpendicular to the inner side and the outer side and extending in a longitudinal direction of the side strap, wherein the side straps form opposite strap strands transverse to the longitudinal direction, wherein at least some of the side straps of the opposite strap strands are connected to each other by a cross-member, wherein at least one end of the cross-member includes a bearing area that interacts with a bearing seat located on a side strap facing towards the end of the cross-member having the bearing area in articulated fashion, for pivoting the cross-member between a closed position and a completely opened position, wherein the at least one end of the cross-member includes, at least one contact area which, in the longitudinal direction of the side strap, is arranged outside the bearing area, the at least one contact area having a contact surface which lies opposite to the inner side of the side strap when the cross-member is in the closed position and having an outer side facing outwards from the chain, wherein the outer side of the at least one contact area facing outwards from the chain comprises a convex curvature or a linear slope upto the contact surface, and encloses an angle of <90° with the inner side of the side strap, such that, when the cross-member is pivoted open to the completely opened position, the contact surface is movable along the inner side of the side strap towards the inside of the chain.

2. The energy guiding chain according to claim 1, wherein the side of the at least one contact area, at the edge of the contact surface which faces outwards from the inside of the chain, encloses an angle of ≤80° with the inner side of the side strap.

3. The energy guiding chain according to claim 1, wherein the bearing seat projects on the inner side of the side strap, and wherein the at least one contact area of the cross-member extends to the side of the bearing seat.

4. The energy guiding chain according to claim 1, wherein the bearing seat is on the inner side of the side strap, and offset towards the inside of the chain in relation to a narrow face of an adjacent side strap.

5. The energy guiding chain according to claim 1, wherein the area of the outer side of the cross-member extending towards the bearing area in a longitudinal direction of the cross-member and the bearing area are offset towards the inside of the chain in relation to the narrow face of an adjacent side strap when the cross-member is in the closed position.

6. The energy guiding chain according to claim 1, wherein the outer side of the cross-member further comprises an essentially flat surface outside the at least one contact area, the essentially flat surface extending in a longitudinal direction of the cross-member towards the bearing area.

7. The energy guiding chain according to claim 6, wherein the essentially flat surface is in a form of an essentially flat plate.

8. The energy guiding chain according to claim 1, wherein the at least one contact area comprises two contact areas located on either side of the bearing area, and each one of the two contact areas has one contact surface.

9. The energy guiding chain according to claim 1, wherein the end of the cross-member includes a shoulder and two journals lying on one axis located on the shoulder, wherein each of the journals is insertable into a respective pocket-shaped journal seat located on the inner side of the side strap, and wherein an edge of the contact surface of the at least one contact area of the cross-member faces outwards from the inside of the chain and lies below, or at the level of, the axis of the journals.

10. The energy guiding chain according to claim 9, wherein each journal seat has a cylindrical space that corresponds to the journal and is wider in relation to an opening for inserting the journal, such that the journal is snapable into the journal seat.

11. The energy guiding chain according to claim 10, wherein each journal is essentially cylindrical and has a first flattened section on a lateral surface of the cylinder that lies parallel to the axis of the journals.

12. The energy guiding chain according to claim 11, wherein a wall of each cylindrical space has a flattened section, where the flattened section and the first flattened section of the journal are positioned such that, in the closed position of the cross-member, the flattened section of the cylindrical space and the first flattened section of the essentially cylindrical journal lie opposite each other.

13. The energy guiding chain according to claim 12, wherein each journal has a second flattened section, lying parallel to the axis of the journal, where the second flattened section is positioned on the journal such that, in the completely opened position of the cross-member, the second flattened section lies opposite the flattened section of the cylindrical space of the journal seat.

14. The energy guiding chain according to claim 13, wherein the first flattened section and the second flattened section of the journal are arranged at an angle >90° relative to each other, which is swept during pivoting of the cross-member between the closed position and the completely opened position.

15. Energy guiding chain according to claim 1, wherein the at least one contact area with the contact surface extends over an entire width of the cross-member outside the bearing area.

* * * * *